United States Patent [19]

Shinada

[11] Patent Number: 5,502,709
[45] Date of Patent: Mar. 26, 1996

[54] APPARATUS FOR RECORDING IMAGES ON INTERIOR SURFACE OF CYLINDER

[75] Inventor: Hidetoshi Shinada, Kanagawa, Japan

[73] Assignee: Fuji Photo Film Co., Ltd., Kanagawa, Japan

[21] Appl. No.: 470,119

[22] Filed: Jun. 6, 1995

[30] Foreign Application Priority Data

Sep. 7, 1994 [JP] Japan ................................. 6-213763
Sep. 7, 1994 [JP] Japan ................................. 6-213772
May 11, 1995 [JP] Japan ................................. 7-113328

[51] Int. Cl.$^6$ ............................. G11B 7/00; G02B 26/08
[52] U.S. Cl. .................. 369/119; 359/204; 359/220; 359/211; 358/493
[58] Field of Search ............................ 369/119, 109, 369/99, 103; 359/204, 220, 211; 358/493, 489

[56] References Cited

U.S. PATENT DOCUMENTS

| | | | |
|---|---|---|---|
| 4,853,709 | 8/1989 | Stein et al. | 359/220 |
| 5,026,133 | 6/1991 | Roddy et al. | 359/211 |
| 5,097,351 | 3/1992 | Kramer | 359/17 |
| 5,214,528 | 5/1993 | Akanaba et al. | 359/211 |

FOREIGN PATENT DOCUMENTS

| | | | |
|---|---|---|---|
| A20483827 | 5/1992 | European Pat. Off. | G06K 15/12 |
| A20530683 | 3/1993 | European Pat. Off. | G06K 15/12 |
| A20551772 | 7/1993 | European Pat. Off. | H04N 1/08 |
| 473829 | 11/1992 | Japan | H04N 1/04 |
| 4-348311 | 12/1992 | Japan | G02B 26/10 |
| 5-27188 | 2/1993 | Japan | G02B 26/10 |
| 5-27190 | 2/1993 | Japan | G02B 26/10 |
| 5-63920 | 3/1993 | Japan | H04N 1/04 |
| 5-308488 | 11/1993 | Japan | H04N 1/08 |
| 5-289018 | 11/1993 | Japan | G02B 26/10 |
| 6-95016 | 4/1994 | Japan | G02B 26/10 |

*Primary Examiner*—Loha Ben
*Attorney, Agent, or Firm*—Sughrue, Mion, Zinn, Macpeak & Seas

[57] ABSTRACT

Parallel laser beams #1, #2 and #3 produced by splitting one laser beam into three, are introduced to an optical scanning device along the central axis of a recording cylinder, the optical scanning device being disposed on the central axis of the recording cylinder and rotated thereabout, having an inclined mirror surface, the recording cylinder holding a recording sheet on an interior surface thereof. The laser beam #2 incident upon the mirror surface at its center of rotation is reflected at the point of incidence, while the laser beams #1 and #3 are deflected by acousto-optical devices back and forth in the opposite directions in synchronism with the rotation of the optical scanning device, in parallel planes held at a distance and including the laser beams #1 and #3 therein, thereby to give the laser beams #1 and #3 angles of incidence upon the mirror surface necessary in order for the laser beams #1, #2 and #3 after reflected to produce scanned loci running parallel to each other at a given interval on the recording sheet, regardless of rotational positions of the optical scanning device. To adjust a relative difference in the lengths of the scanned loci, timing at which the laser beams #1, #2 and #3 are turned on/off is controlled. When the laser beams #1 and #3 are deflected so as to gyrate along a conical plane whose central axis is that of the recording cylinder, the laser beams #1, #2 and #3 produce scanned loci always running parallel to each other at a given interval with the same scanning lengths on the recording sheet.

10 Claims, 16 Drawing Sheets

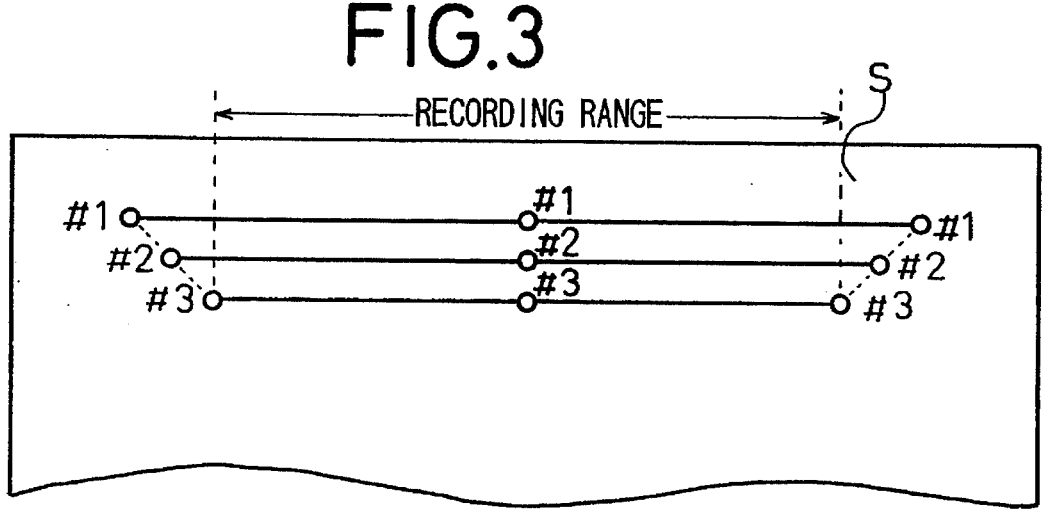

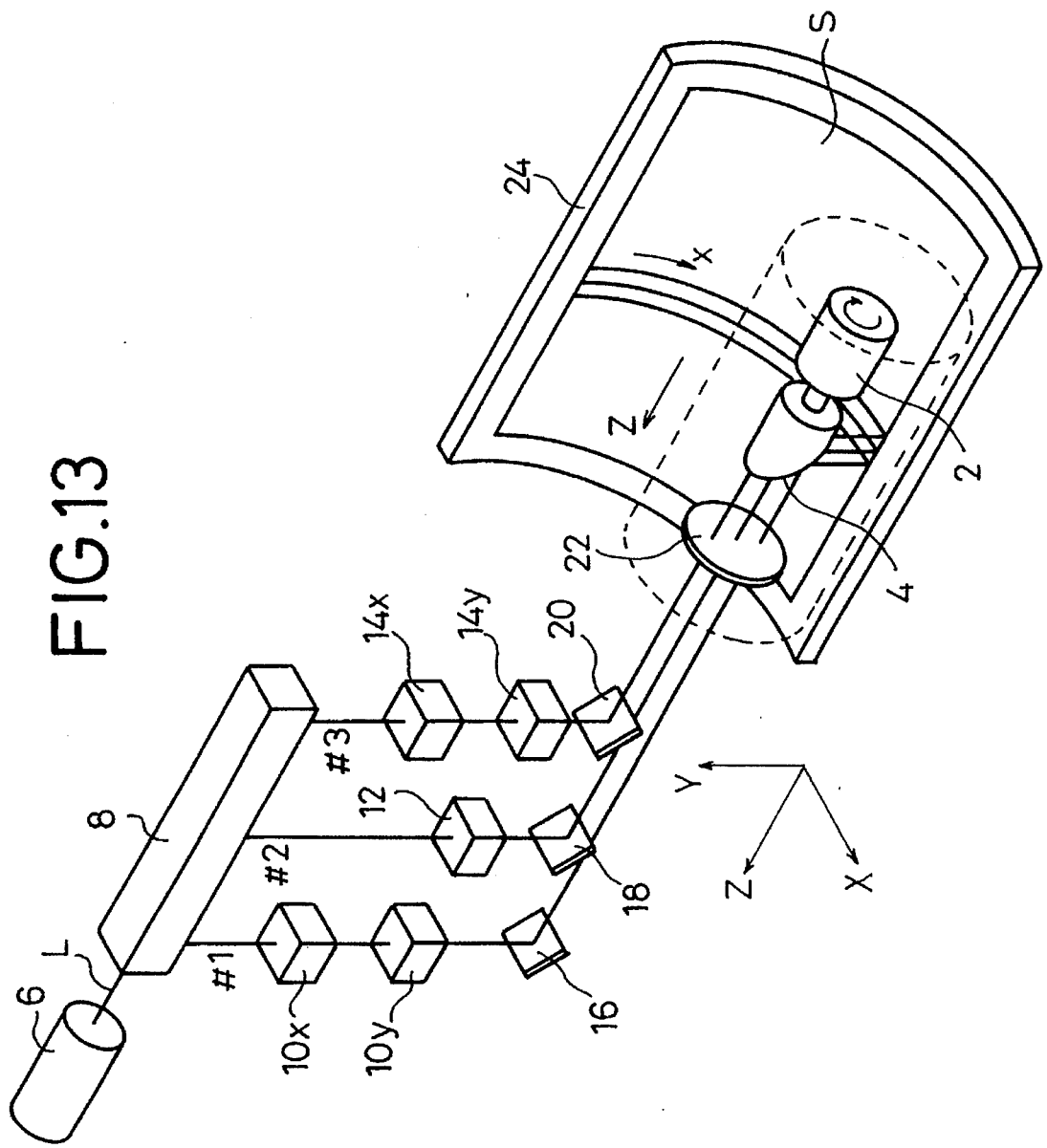

APPARATUS FOR RECORDING IMAGES ON INTERIOR SURFACE OF CYLINDER

BACKGROUND OF THE INVENTION

1. Field of the Invention

This invention relates to an image recording apparatus in which a recording sheet is held on an interior surface of a cylinder and scanned by a plurality of light beams modulated according to image information.

2. Description of the Related Art

To record images on a recording sheet, there are used several types of recording apparatuses: a type in which a flat recording sheet being fed in an auxiliary scanning direction is scanned by a laser beam in a main scanning direction; another type in which a recording sheet held on a cylindrical surface is scanned by a laser beam; and a still other type of image recording apparatus in which a recording sheet is held on an interior surface of a cylinder and scanned by a laser beam (hereinafter referred to as a "cylindrical interior surface scanning type"). Among these apparatuses, the cylindrical interior surface scanning type apparatus has been increasingly used because of its superiority in recording precision, speed, economy, and so on. In the recording apparatus of this type, the recording sheet is rarely peeled off from a holding surface during the recording, since the recording sheet is held inside of the cylinder.

In the cylindrical interior surface scanning type image recording apparatus, the laser beam is introduced along the central axis of the cylinder to an optical scanning device disposed on and rotated about the central axis of the cylinder. The optical scanning device comprises a mirror surface inclined substantially at 45° with respect to the incident direction of the laser beam to deflect the laser beam 90° toward the recording sheet held on the interior surface of the cylinder, thereby to scan it.

There is an attempt, in the image recording apparatus of this type, of simultaneously scanning the recording sheet with a plurality of laser beams to increase the recording speed. However, when the plurality of laser beams are simply introduced to the optical scanning device, each of the laser beams deflected by the mirror surface produces a non-linear scanned locus on the recording sheet, and it is impossible to properly record images on the recording sheet.

Specifically, as shown in FIG. 15A, when the mirror surface 4 poses an illustrated attitude, with a shorter diameter of an elliptic mirror surface lying along the Y axis, three laser beams #1, #2 and #3 parallel to the Z-axis and incident upon the mirror surface are reflected along the X-Y plane, producing respective scanned loci lying one upon another on the recording sheet S. When the mirror surface 4 is rotated by 90° from the attitude shown in FIG. 15A to that of FIG. 15B, the laser beams #1, #2 and #3 are reflected along the Y-Z plane producing respective scanned loci separated from each other on the recording sheet S. When the mirror surface 4 is further rotated by 90° from the attitude shown in FIG. 15B to that of FIG. 15C, the laser beams #1, #2 and #3 are again reflected along the X-Y plane, producing respective scanned loci lying one upon another on the recording sheet S. As shown in FIG. 16, the laser beam #2 incident upon the mirror surface at its center of rotation has a scanned locus of a straight line on the recording sheet S, while the rest of laser beams, #1 and #3, incident upon the mirror surface at points other than its center of rotation have scanned loci varying depending on the attitude of the mirror surface 4, resulting in curved lines.

To avoid the above-described difficulty encountered when a plurality of laser beams are used, several proposals have been made.

According to the first of them, a hologram for adjusting deflection angles depending on incident positions of the laser beams is interposed between laser beam sources and an optical scanning device, the hologram rotating together with the rotation of the optical scanning device, thereby adjusting the incident positions of the laser beams upon the optical scanning device to make the scanned loci straight lines on the recording sheet (Japanese Patent Publication No. 4-73829).

According to the second of the proposals, P- and S-polarized laser beams are generated. One laser beam is led to a recording sheet via a polarizing beam splitter which is rotating. The other laser beam separated by the polarizing beam splitter is led to the recording sheet via a reflecting surface which is rotating (Japanese Laid-Open Patent Publication No. 5-27188).

According to the third of the proposals, P- and S-polarized laser beams are respectively modulated according to image information. One laser beam is then led to a recording sheet via a hologon (a holographic diffraction grating) which is rotating, and the other laser beam is led to the recording sheet via the hologon and a mirror whose angle is controlled by a piezoelectric device in accordance with the rotational angle of the hologon, thereby to maintain proper interval between the two laser beams on the recording sheet (U.S. Pat. No. 5,097,351).

According to the fourth of the proposals, a light scanner is provided which leads laser beams onto a recording sheet after reflecting the laser beams three times, thereby to cancel twists between the laser beams (Japanese Laid-Open Patent Publication Nos. 5-27190, 5-289018 and 5-308488).

According to the fifth of the proposals, a rotating light optical scanning device having a transparent layer on a reflecting surface is provided, and a plurality of laser beams having different wave lengths are respectively led to the rotating light optical scanning device. The laser beams are separated from each other owing to the difference in refractive indexes between them and led to a recording sheet (Japanese Laid-Open Patent Publication Nos. 4-348311 and 6-95016).

However, some of these prior art apparatuses suffer difficulty in that complexity of the apparatus is increased and accuracy of recording images is limited due to multiplicity of components included therein which are rotated together with the optical scanning device. In the apparatuses disclosed by Japanese Laid-Open Patent Publication Nos. 4-348311 and 6-95016, for example, which are relatively simple in structure, however, precise control of the wave lengths is very difficult, and hence the intervals between the scanned loci of the laser beams on the recording sheet.

In the apparatus disclosed by U.S. Pat. No. 5,097,351, though it is possible to control the intervals between scanned loci of the laser beams, there is no specific description on how to control the positions of scanned loci on the recording sheet. Therefore, accurate recording of images is thought to be difficult.

Further, the apparatuses disclosed in Japanese Laid-Open Patent Publication No. 5-27188 and U.S. Pat. No. 5,097,351 suffer shortcomings in that a remarkable increase in recording speed cannot be hoped for since only two laser beams are controlled in these apparatuses.

SUMMARY OF THE INVENTION

The present invention has been made to solve the above problems. Therefore, it is an object of the invention to provide an apparatus for recording images on a recording sheet held on an interior surface of a cylinder, in which a plurality of laser beams are accurately led to the recording sheet to attain a high speed recording without introducing any rotating component other than an optical scanning device.

To achieve the above object, an apparatus provided according to the present invention comprises light beam generating means for generating a plurality of light beams, scanning means disposed on the central axis of the cylinder and rotated thereabout comprising a mirror surface inclined with respect to the central axis of the cylinder along which the light beams are incident upon the mirror surface for scanning the recording sheet with respective light beams reflected by the mirror surface, light beam deflecting means for deflecting light beams selected from the plurality of light beams off the central axis of the cylinder to give each of the selected light beams an angle of incidence upon the mirror surface necessary in order for the plurality of light beams reflected by the mirror surface to be separated at a predetermined interval from each other on the recording sheet, and control means for controlling the direction and amount in which each of the selected light beams is deflected by the light beam deflecting means in synchronism with the rotation of the scanning means.

In the above apparatus, the selected light beams may be other than the light beam incident upon the mirror surface at its center of rotation.

In the above apparatus, the light beam deflecting means may deflect the selected light beams back and forth in synchronism with the rotation of the optical scanning device under the control of the control means, in a plane including each of selected light beams therein and lying parallel to another at a given distance.

In the above apparatus, the light beam deflecting means may comprise first and second light beam deflecting devices for deflecting each of the selected light beams in a first direction and synchronizedly in a second direction perpendicular to the first direction under the control of the control means, in which each of the selected light beams deflected by the light beam deflecting means draws substantially a circle on a plane perpendicular to the central axis of the cylinder, with the center of the circle being at a point where the central axis of the cylinder crosses that plane.

With the above arrangement, the light beam incident upon the mirror surface at its center of rotation (a central light beam) is always reflected at the point of incidence, while a light beam other than the central light beam (a selected light beam) is deflected by the light beam deflecting means to alter its angle of incidence upon the mirror surface depending on the rotational position of the mirror surface, thereby to maintain the scanned loci of the reflected light beams on the recording sheet parallel to each other at a predetermined interval.

There are two ways of deflecting the selected light beam proposed in the present invention: firstly, deflecting the selected light beam back and forth in one direction (in the direction of X-axis) in a plane including the selected light beam and lying parallel to another at a distance; and secondly, deflecting the selected light beam simultaneously in two directions perpendicular to each other (a combined movement along X- and Y-axes) by the use of two light beam deflecting devices, thereby causing respective light beams to gyrate along a conical plane whose central axis is that of the cylinder.

With the first way, however, the light beams reflected by the mirror surface hit the recording sheet unevenly at different scanning positions for a certain rotational position of the mirror surface, resulting in different lengths for respective scanned loci. To compensate this unevenness of the scanned loci, it is necessary to adjust timing when respective light beams are turned on and off. With the second way of deflecting the light beams, in contrast, it is possible to obtain reflected light beams which always hit the recording sheet evenly without any adjustment.

Since the scanning means is the only rotational component included in the apparatus according to the invention, it is possible to keep its operational accuracy without any mechanical adjustment, making the apparatus compact in size. Since the lengths of respective scanned loci on the recording sheet are adjustable by controlling the starting and ending points of the scanned loci electrically, accurate recording of images can be realized.

BRIEF DESCRIPTION OF THE DRAWINGS

FIG. 3 shows scanned loci produced by light beams on a recording sheet according to the first embodiment;

FIG. 13 is a perspective view showing an apparatus for putting into operation the principle on which the second embodiment of the present invention is based;

DETAILED DESCRIPTION OF THE PREFERRED EMBODIMENTS

An apparatus for recording images on an interior surface of a cylinder according to the present invention will hereinafter be described in detail with reference to the accompanying drawings in which preferred embodiments are shown by way of illustrative example.

Figure 1:
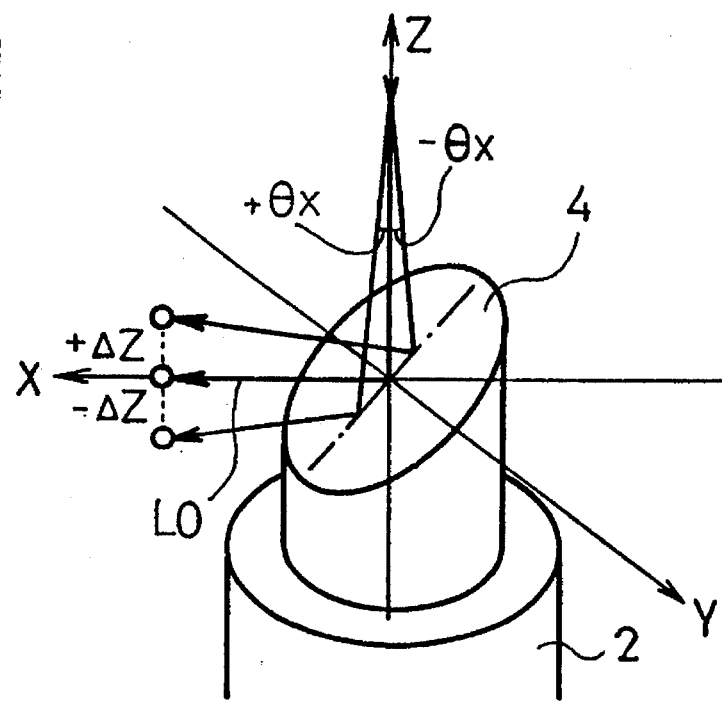
FIG. 1 is a view for schematically explaining the principle upon which the present invention is based.
Figure 2A:
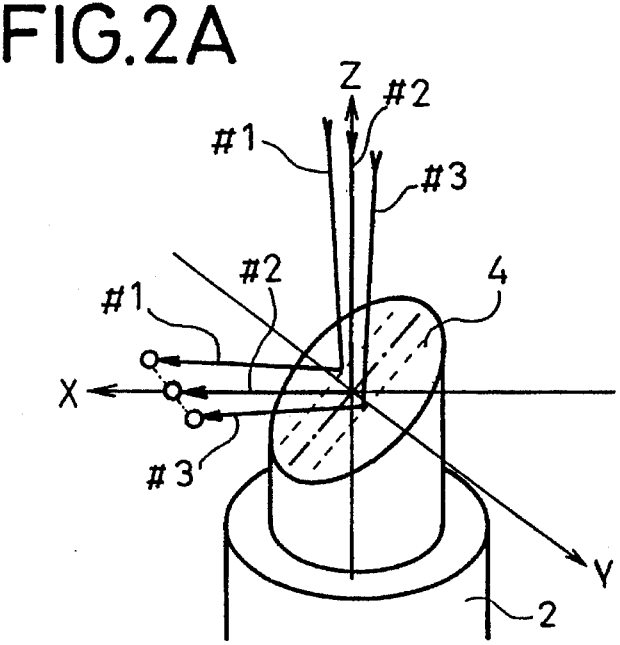
FIGS. 2A and 2B are views for explaining how a first embodiment of the present invention works.
Figure 2B:
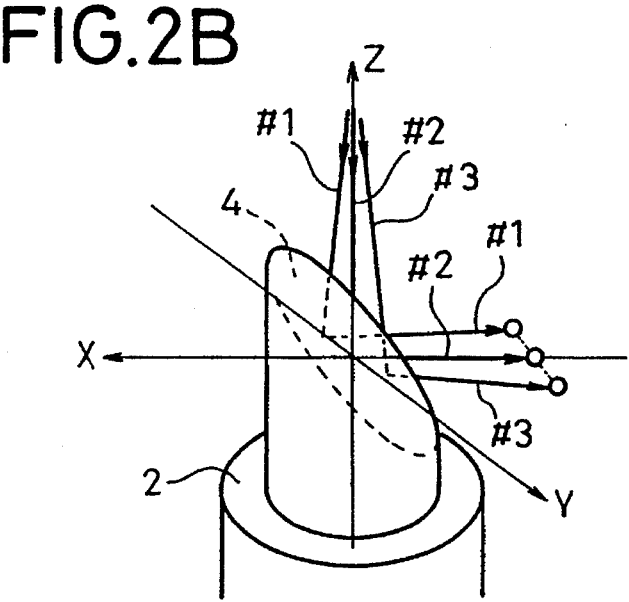

FIGS. 1, 2A and 2B schematically explain the principle upon which a first embodiment of the present invention is based.

When a mirror surface 4 of an optical scanning device 2 poses an illustrated attitude shown in FIG. 1, with a shorter diameter of an elliptic mirror surface 4 lying along Y-axis, a laser beam $L_0$ incident upon the center of the mirror surface 4 is reflected along X-axis. In this situation, when the laser beam $L_0$ is deflected by $+\theta_x$ with respect to Z-axis in the direction of X-axis, the reflection path of the laser beam $L_0$ reflected on the mirror surface 4 is shifted in the X-Z plane by $-\Delta Z$ along Z-axis. When the laser beam $L_0$ is deflected by $-\theta_x$ with respect to Z-axis in the direction of X-axis, the reflection path of the laser beam $L_0$ is shifted in the X-Z plane by $+\Delta z$ along Z-axis.

Figure 15A:
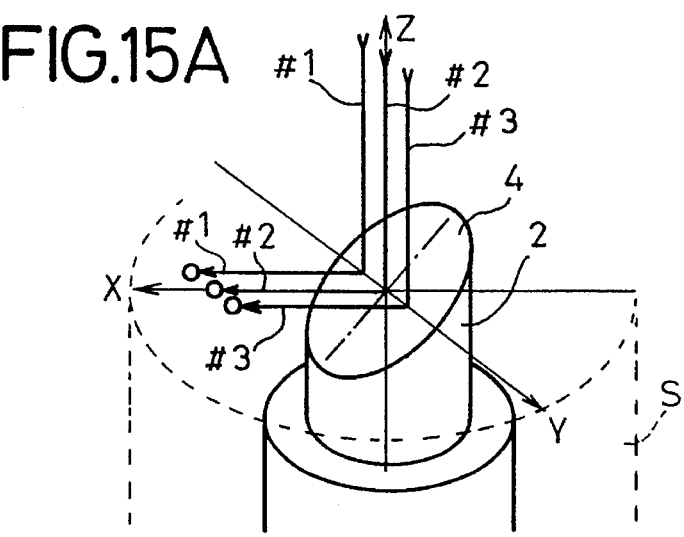
FIGS. 15A, 15B and 15C are perspective views of the mirror surface for explaining how the light beams are reflected by the mirror surface when no control is effected on the light beams.
Figure 15B:
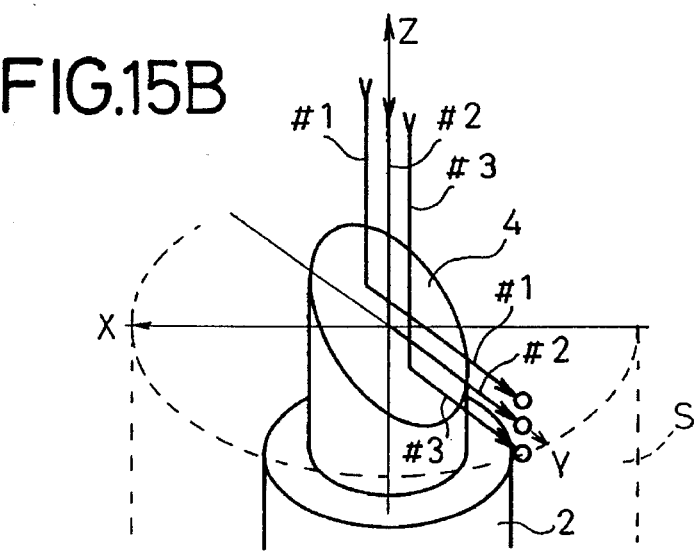
Figure 15C:
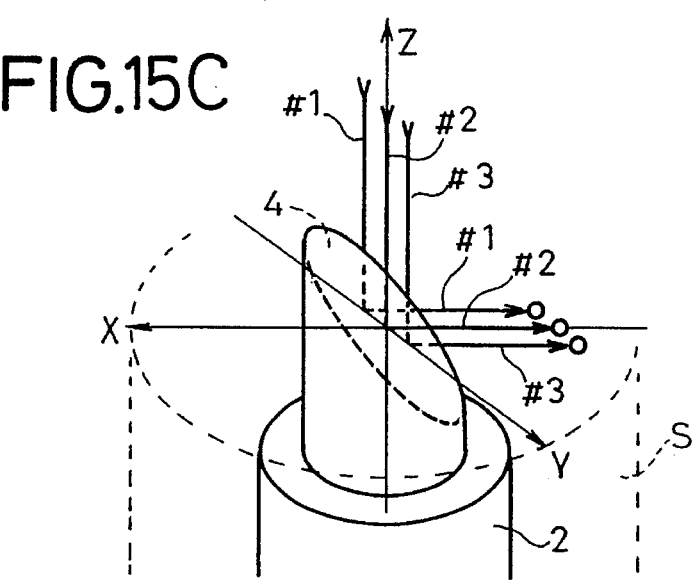
Figure 16:
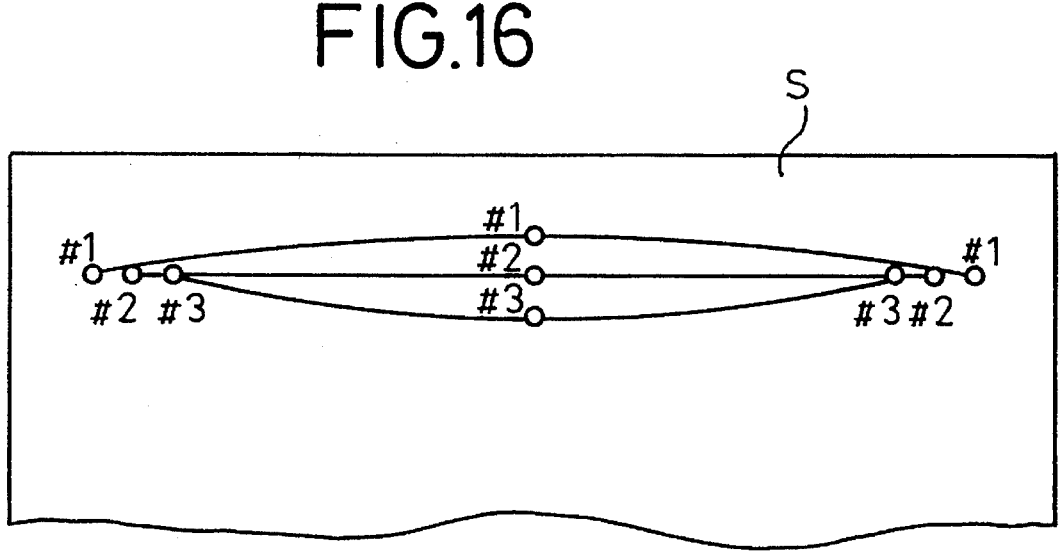
FIG. 16 shows scanned loci produced by the light beams on a recording sheet when no control is effected on the light beams.

In the apparatus according to a first embodiment of the invention, three laser beams #1, #2 and #3 parallel to each other are introduced to the optical scanning device 2 along Z axis. The laser beam #2 is introduced to the optical scanning device 2 at its center of rotation, and laser beams #1 and #3 are respectively apart from the laser beam #2 by a predetermined distance in the direction of Y-axis. By deflecting the laser beams #1 and #3 by a certain angle in the negative and positive directions respectively along X-axis, it is possible to shift the reflection paths thereof in the positive and negative directions along Z-axis by a certain amount, respectively. Accordingly, since the reflection paths of the laser beams #1 and #3 which have been included in the X-Y plane as shown in FIG. 15A are seemingly rotated about the reflection path of the laser beam #2, intervals along Z-axis between the reflection paths of the three laser beams are provided as shown in FIG. 2A, thereby avoiding the reflection paths of the three laser beams from coming one upon another on the recording sheet. In a similar situation in which the mirror surface 4 of the optical scanning device 2 poses another illustrated attitude as shown in FIG. 2B, by deflecting the laser beam #1 in the positive direction of X-axis and the laser beam #3 in the negative direction, the reflection paths of the laser beams #1 and #3 which have been included in the X-Y plane as shown in FIG. 15C are seemingly rotated about the reflection path of the laser beam #2, intervals along Z-axis between each of the reflection paths of the three laser beams are provided as shown in FIG. 2B, thereby avoiding the reflection paths of the three laser beams from coming one upon another on the recording sheet.

As described above, it is possible to produce the scanned loci of the laser beams #1, #2 and #3 in the form of parallel lines separated from each other by a given interval regardless of the scanning position on the entire range of the recording sheet S, as shown in FIG. 3, by properly adjusting the directions of incidence of the laser beams #1 and #3 upon the mirror surface 4 in the X-Z plane.

Figure 4A:
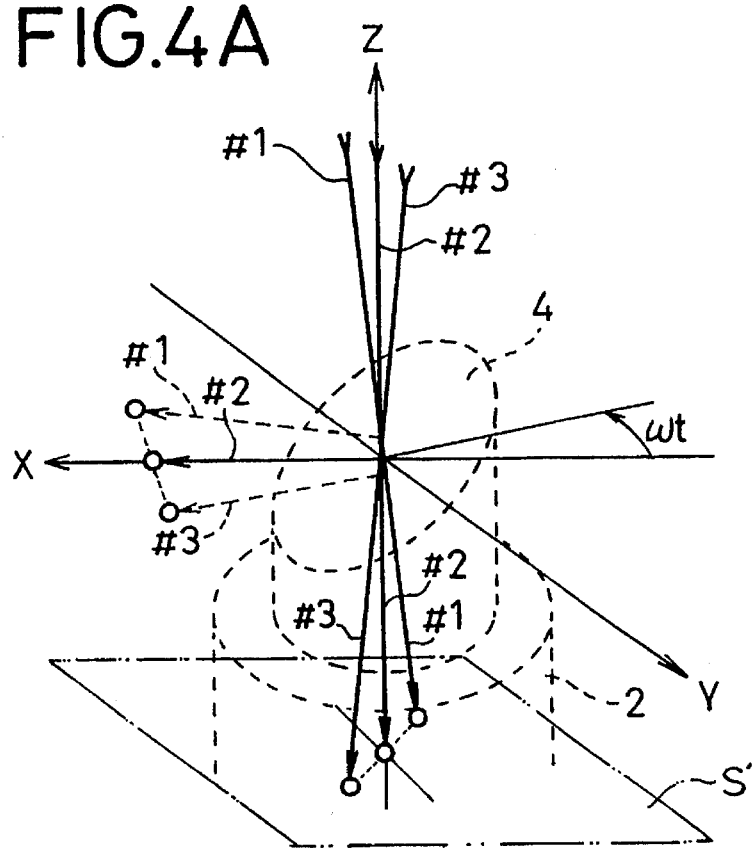
FIGS. 4A and 4B show loci drawn by the light beams on a conjugate plane of the recording sheet according to the first embodiment.

When the laser beams #1, #2 and #3 incident upon the mirror surface 4 are projected on a conjugate plane S' of the recording sheet S, each spot of the laser beams #1 and #3 on the conjugate plane S' makes a simple harmonic motion as shown in FIG. 4 which is represented by the following formulas, in which ω is the angular velocity of the optical scanning device 2:

$X = -a \cdot \cos \omega t$ ... for the spot of laser beam #1, and $X = a \cdot \cos \omega t$ ... for the spot of laser beam #3.

Accordingly, a plurality of scanned loci parallel to and apart from each other at a given interval, as shown in FIG. 3, can be formed on the recording sheet, by deflecting the laser beams #1 and #3 according to the above formulas and introducing them to the optical scanning device 2.

Figure 5:
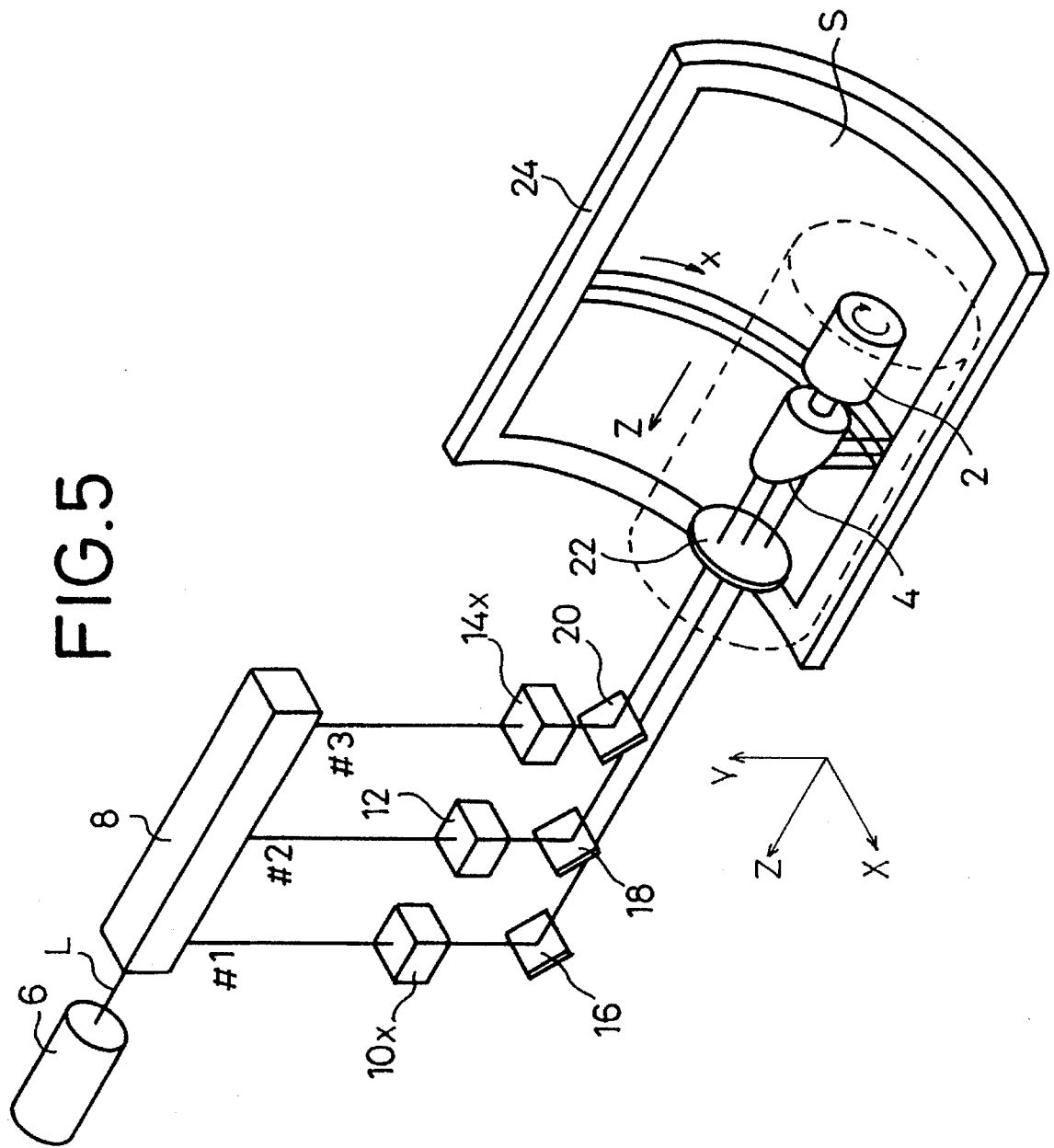
FIG. 5 is a perspective view showing an apparatus for putting into operation the principle on which the first embodiment of the present invention is based.

FIG. 5 shows an apparatus for putting into operation the principle described above on which the first embodiment of the present invention is based. The apparatus shown in FIG. 5 comprises a laser beam generator 6 for generating a laser beam L, a beam splitter 8 for splitting the generated laser beam L into three laser beams #1, #2 and #3, an acousto-optical device 10X for deflecting the laser beam #1 in the direction of X-axis shown in FIG. 5 and modulate it according to image information, an acousto-optical device 12 for modulating the laser beam #2 according to the image information without deflecting it, an acousto-optical device 14X for deflecting the laser beam #3 in the direction of the X-axis and modulate it according to the image information, mirrors 16, 18 and 20 for reflecting the laser beams #1, #2 and #3, respectively, a condenser lens 22 for condensing the laser beams #1, #2 and #3, and an optical scanning device 2 having a rotating mirror surface 4 for reflecting and leading the laser beams #1, #2 and #3 to a recording sheet S. The recording sheet S is held on an interior surface of a cylindrical drum 24, and the optical scanning device 2 is disposed on the central axis of the drum 24.

Figure 6:
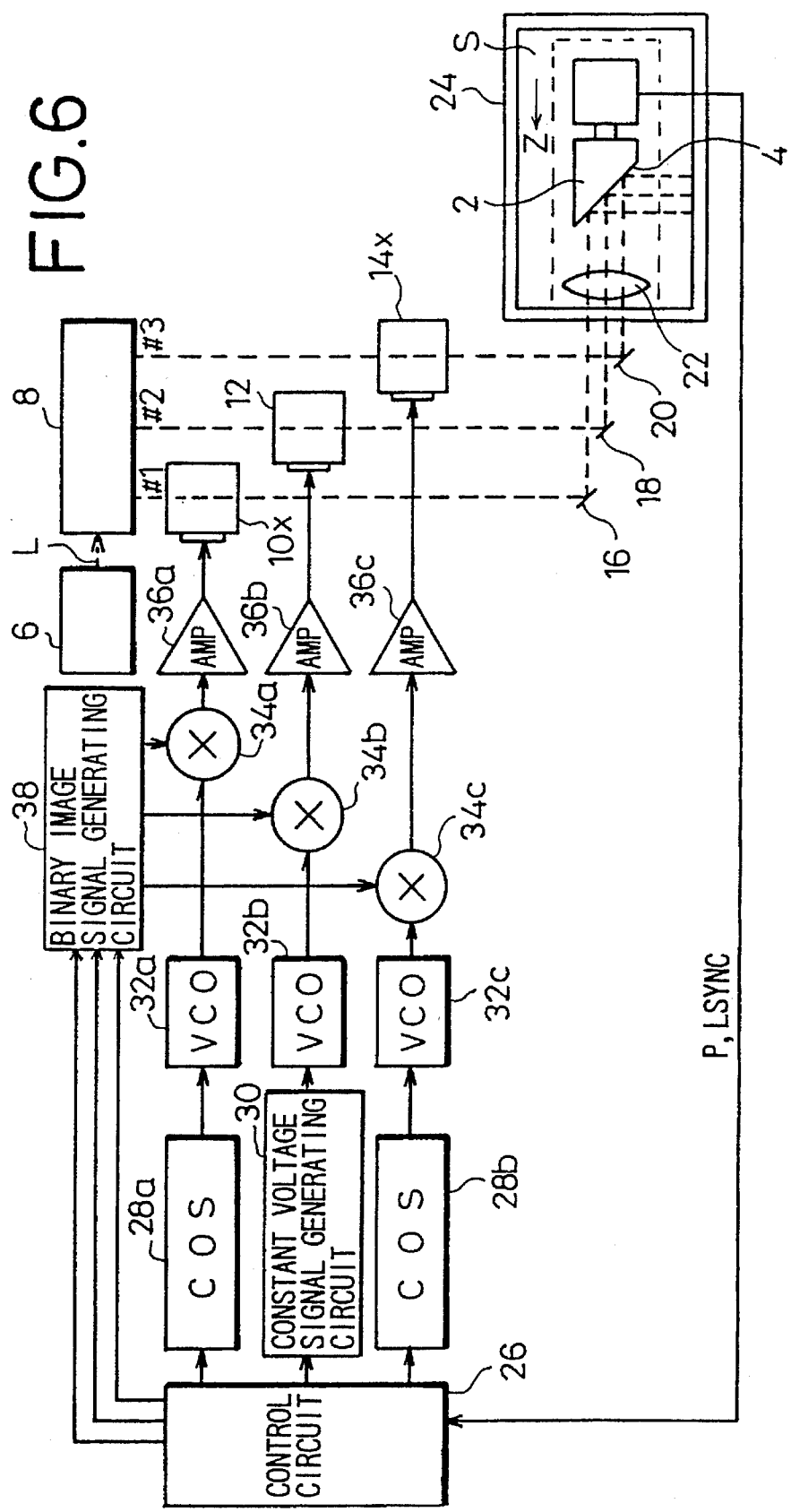
FIG. 6 is a block diagram showing a control circuit employed in the apparatus shown in FIG. 5.

FIG. 6 shows a circuit for controlling the acousto-optical devices 10X, 12 and 14X.

The circuit shown in FIG. 6 comprises a control circuit 26 for generating control clock signals based on a signal from an encoder (not shown) provided in the optical scanning device 2, a cosine-wave signal generating circuit 28a for generating a cosine-wave voltage signal ($X = -a \cdot \cos \omega t$) based on the control clock signal, a cosine-wave signal generating circuit 28b for generating a cosine-wave voltage signal ($X = a \cdot \cos \omega t$) based on the control clock signal, a constant voltage signal generating circuit 30 for generating a constant voltage signal based on the control clock signal, voltage-controlled oscillators 32a, 32b, 32c for frequency-modulating the cosine-wave voltage signals and the constant voltage signal, modulators 34a, 34b, 34c for respectively modulating the frequency-modulated signals according to binary image signals, amplifiers 36a, 36b, 36c for amplifying the modulated signals from the modulators 34a, 34b, 34c and supplying the amplified signals to the acoustooptical devices 10X, 12, 14X, and a binary image signal generating circuit 38 for generating the binary image signals of a desired image respectively based on the control clock signals.

Figure 7:
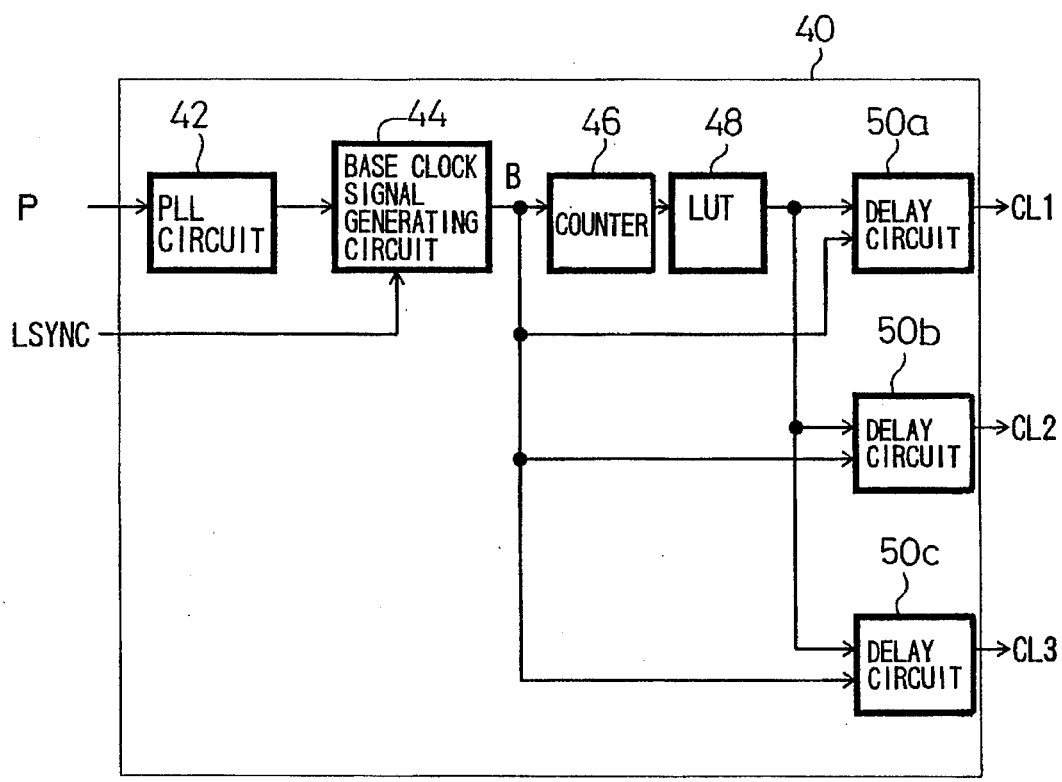
FIG. 7 is a block diagram showing a circuit for generating control clock signals in the apparatus shown in FIG. 5.

Scanned loci, on the recording sheet S, produced by the laser beams #1, #2 and #3 deflected by the acousto-optical devices 10X, 12, 14X and reflected by the mirror surface 4 have different scanning lengths respectively in the direction of a main scanning direction (shown by the arrow x in FIG. 5). To compensate the difference in the lengths of the scanned loci to record an image accurately, a control clock signal generating circuit 40 shown in FIG. 7 is provided in the control circuit 26.

The control clock signal generating circuit 40 comprises a phase locking loop (PLL) circuit 42 for generating a phase sync signal based on a rotational position signal P supplied from the unillustrated encoder provided in the optical scanning device 2, a base clock signal generating circuit 44 for generating a base clock signal B from the phase sync signal based on a main scan starting signal LSYNC supplied by the encoder, a counter 46 for counting the number of the base clock signals, a look-up table 48 which outputs a delay amount setting signal for setting delay amount for each of the control clock signals CL1, CL2, CL3 to control the laser beams #1, #2 and #3 based on the count in the counter 46, and delay circuits 50a, 50b, 50c for generating the control clock signals CL1, CL2, CL3 from the base clock signal by delaying it by necessary delay amounts, respectively. The control clock signals CL1, CL2, CL3 are fed to the binary image signal generating circuit 38 shown in FIG. 6.

The operation of the apparatus shown in FIG. 5 will be described below.

The laser beam L outputted from the laser beam generator 6 is splitted into three laser beams #1, #2, #3. The laser beam #1 is deflected by the acousto-optical device 10X in the direction of X-axis (see FIGS. 2A, 2B), and simultaneously on/off controlled according to the image information. Then, after being reflected by the mirror 16, the laser beam #1 is led to the optical scanning device 2 through the condenser lens 22. The optical scanning device 2 reflects the laser beam #1 on the mirror surface 4 rotating about the central axis of the drum 24 and leads it onto the recording sheet S. The laser beam #3 is also led onto the recording sheet S through the acousto-optical device 14X, the mirror 20, the condenser lens 22 and the optical scanning device 2. The laser beam #2 incident upon the mirror surface 4 at its center of rotation is led onto the recording sheet S, after on/off controlled by the acousto-optical device 12 according to the image information without being deflected, through the mirror 18, condenser lens 22 and the optical scanning device 2. An image is formed on the recording sheet S with three scanned loci of the three laser beams which run parallel to each other with a given interval therebetween.

Next, the manner in which the laser beams #1, #2, #3 are controlled will be described in detail with reference to FIG. 6.

The control circuit 26 supplies the control clock signals to the cosine-wave signal generating circuits 28a, 28b based on the rotational position signal P supplied by the unillustrated encoder provided in the optical scanning device 2 and the main scan starting signal LSYNC. The cosine-wave signal generating circuits 28a, 28b supply the cosine-wave voltage signals which are off-phase by 180° from each other (X=−a·cos ωt and X=a·cos ωt) to respective voltage-controlled oscillators 32a, 32c. The voltage-controlled oscillators 32a, 32c convert the cosine-wave voltage signals into frequency-modulated signals, and the converted frequency-modulated signals are supplied to the acousto-optical devices 10X, 14X via the amplifiers 36a, 36c, after on/off controlled by the modulators 34a, 34c according to the binary image signal. The acousto-optical devices 10X, 14X respectively deflect the laser beams #1 and #3 in the direction of X-axis based on the frequency-modulated signals.

The control circuit 26 also supplies one of the control clock signals to the constant-voltage signal generating circuit 30, and the generated constant-voltage signal is supplied to the voltage-controlled oscillator 32b, which converts the constant-voltage signal into the frequency-modulated signal. The frequency-modulated signal is supplied to the acousto-optical device 12 through the amplifier 36b, after being on/off controlled by the modulator 34b according to the binary image signal. The acousto-optical device 12 only on/off controls the laser beam #2 without deflecting it.

Figure 4B:
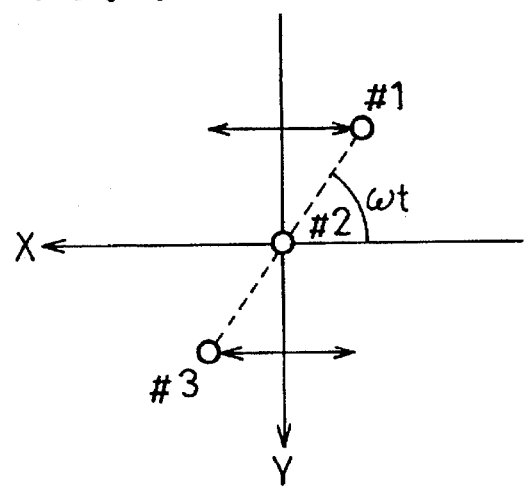

As a result, as shown in FIG. 4B, the laser beam #1 led to the mirror surface 4 of the optical scanning device 2 makes a simple harmonic motion along X-axis in synchronism with the rotation of the optical scanning device 2. Similarly, the laser beam #3 also makes another simple harmonic motion off-phase by 180° from that of the laser beam #1 as shown in FIG. 4B. The laser beam #2 is led to the recording sheet S after only being on/off controlled without making a simple harmonic motion. As shown in FIG. 3, the laser beams #1, #2 and #3 controlled to maintain a given interval between them are led to the recording sheet S and an image is recorded thereon. The interval may be easily controlled by the amplification factors set for the amplifiers 36a, 36b, 36c.

As seen from FIG. 3, respective scanned loci of the laser beams #1, #2 and #3 have starting and ending points different from each other, resulting in different scanning lengths, when the laser beams #1 and #3 are controlled to be deflected in the direction of X-axis only, and there arises a fear that distortion in the recorded image becomes visually recognizable when the difference in the scanning lengths is large. The above problem can be solved by adjusting the timing at which the binary image signal is supplied to the modulators 34a, 34b, 34c, under the control by the control clock signals CL1, CL2, CL3 generated by the control clock signal generating circuit 40.

Figure 8:
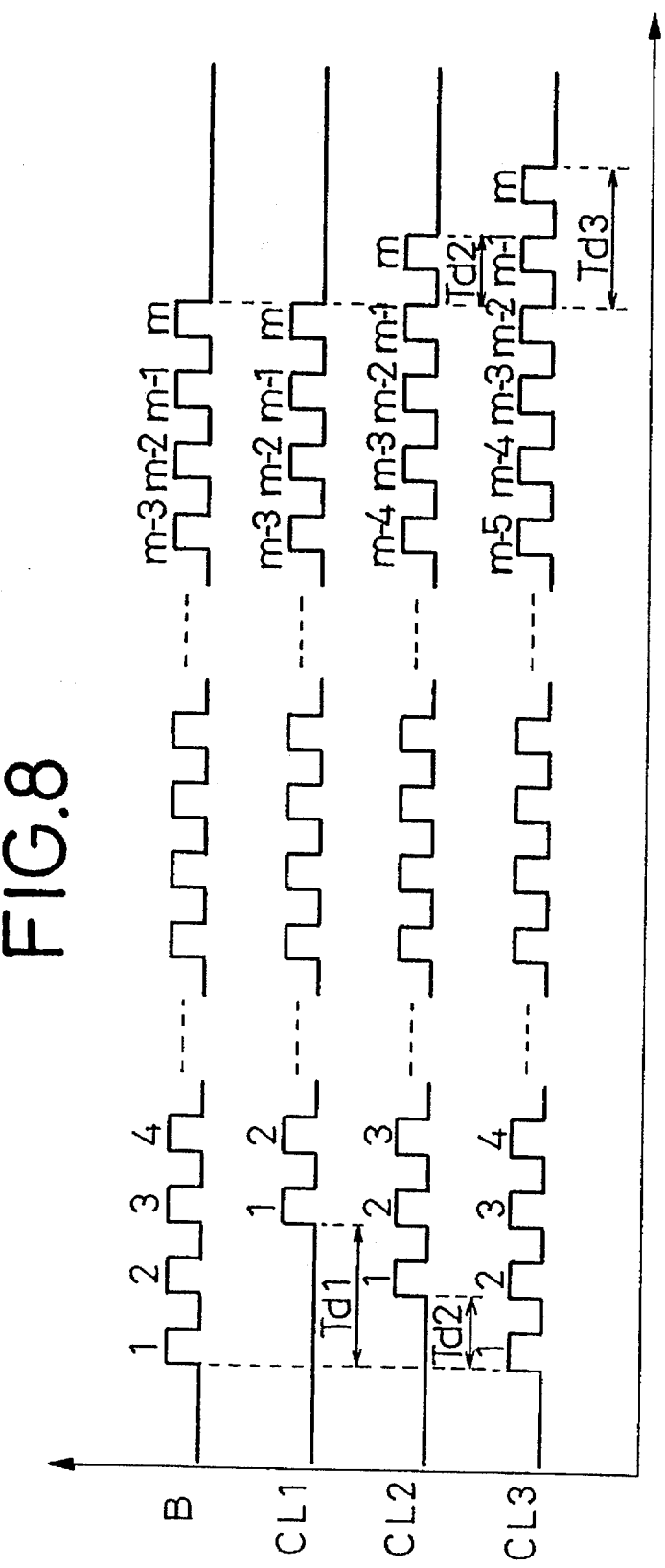
FIG. 8 is a chart showing respective wave forms of the control clock signals generated by the circuit shown in FIG. 7.

Specifically, the rotational position signal P supplied by the unillustrated encoder provided in the optical scanning device 2 is controlled its phase by the PLL circuit 42, and a phase sync signal is generated therefrom. The phase sync signal is supplied to the base clock signal generating circuit 44 to generate a base clock signal B under the control of the main scan starting signal LSYNC, as shown in FIG. 8. The base clock signal B is counted its number by the counter 46 and supplied to the delay circuits 50a, 50b, 50c which are described below. The count of the base clock signal B at the counter 46 is supplied to the look-up table 48. The look-up table 48 supplies the delay amount setting signals having been set beforehand to respective delay circuits 50a, 50b, 50c in response to the count given by the counter 46 which correspond to the scanning positions of the laser beams #1, #2, #3 on the recording sheet S. The delay circuits 50a, 50b, 50c produce the control clock signals CL1, CL2, CL3, respectively, by delaying the base clock signal by respective delay amounts in response to the delay amount setting signals. The control clock signals CL1, CL2, CL3 are fed to the binary image signal generating circuit 38.

The control clock signal CLi controls the timing in which the binary image signal is outputted to be recorded by the laser beam #1. As shown in FIG. 8, the delay circuit 50a delays a start of recording the binary image signal by a period Td1 behind a main scan starting time of the base clock signal B in response to the delay amount setting signal supplied from the look-up table 48, and sets an end of recording the binary image signal at a main scan finishing time (m-th clock pulse) of the base clock signal B. The pulse intervals in the control clock signal CL1 are set to be as uniform as possible based on the delay amount setting signal supplied from the look-up table 48.

The control clock signal CL2 controls the timing in which the binary image signal is outputted to be recorded by the laser beam #2. As shown in FIG. 8, the delay circuit 50b delays a start of recording the binary image signal by a period Td2 behind the main scan starting time of the base clock signal B in response to the delay amount setting signal, and delays an end of recording the binary image signal by a period Td2 behind the main scan finishing time (m-th clock pulse) of the base clock signal B. The pulse intervals in the control clock signal CL2 are set to be as uniform as possible based on the delay amount setting signal.

The control clock signal CL3 controls the timing in which the binary image signal is outputted to be recorded by the laser beam #3. As shown in FIG. 8, the delay circuit 50c delays a start of recording the binary image signal by a period Td3 behind the main scan starting time of the base clock signal B in response to the delay amount setting signal, and delays an end of recording the binary image signal by a period Td3 behind the main scan finishing time (m-th clock pulse) of the base clock signal B. The pulse intervals in the control clock signal CL3 are set to be as uniform as possible based on the delay amount setting signal.

It is desirable to set the delay amount setting signals randomly between scan lines, in order that delayed positions in adjacent scan lines do not coincide with each other, because the delayed positions in adjacent scan lines which coincide with each other may cause an interference beat with the frequency of halftoning dots, resulting in unevenness in the recorded image.

The control clock signals CL1, CL2, CL3, produced as described above, are supplied to the binary image signal generating circuit 38. The binary image signal generating circuit 38 outputs the binary image signals to the modulators 34a, 34b, 34c at the timing shown in FIG. 8. As a result, as shown in FIG. 3, the laser beams #1 and #2 modulated by respective binary image signals record an image on the recording sheet in the same range as the laser beam #3 records the image. Accordingly, an accurate image free from distortion can be formed by the scan lines each having the same recording range in the main scanning direction.

In the first embodiment described above, the difference between the lengths of scan lines produced by the laser beams #1, #2 and #3 is overcome by adjusting the timing of recording by respective scan lines. Alternatively, as in a second embodiment described below, scan lines inherently having constant length and interval may be utilized. In the second embodiments, those parts identical to those of the first embodiment are denoted identically, and detailed description thereof is omitted.

FIGS. 9A–9C, 10A and 10B schematically explain the principle upon which a second embodiment of the present invention is based.

Figure 9A:
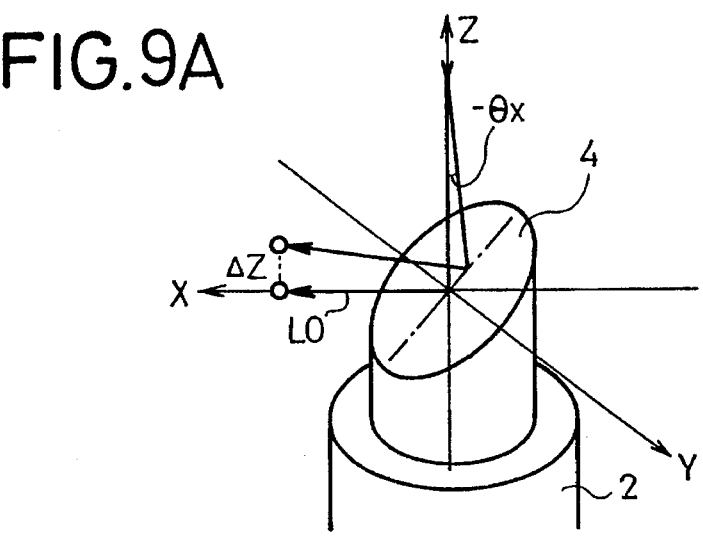
FIGS. 9A, 9B and 9C are views for explaining how a second embodiment of the present invention works.
Figure 9B:
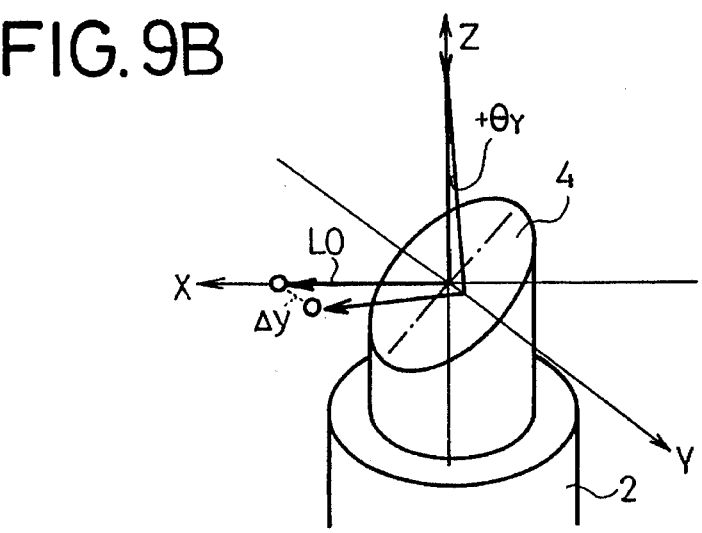
Figure 10A:
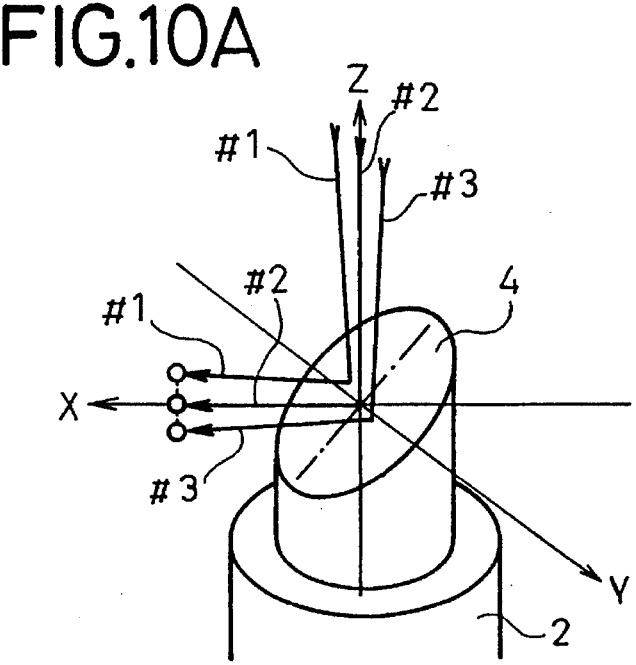
FIGS. 10A and 10B are views for further explaining how the second embodiment works.
Figure 10B:
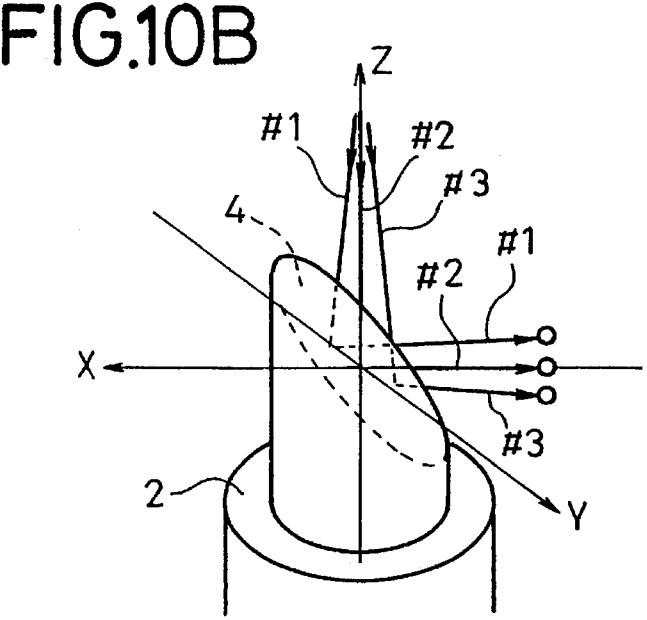

When the mirror surface 4 of an optical scanning device 2 poses an illustrated attitude as shown in FIG. 9A, with a shorter diameter of an elliptic mirror surface 4 lying along Y axis, and when a laser beam $L_0$ incident upon the center of the mirror surface 4 along Z-axis is deflected by $-\theta_x$ with respect to Z-axis in the direction of X-axis, the reflection path of the laser beam $L_0$ reflected by the mirror surface 4 is shifted in the X-Z plane by $+\Delta Z$ along Z axis. When the laser beam $L_0$ is deflected by $+\theta_y$ with respect to Z axis in the direction of Y-axis, as shown in FIG. 9B, the reflection path of the laser beam $L_0$ is shifted in the X-Y plane by $-\Delta Y$ along Y-axis. Therefore, it is possible to shift the reflection path of the laser beam $L_0$ two-dimensionally on the recording sheet S, by deflecting the laser beam $L_0$ by $\theta_{xy}$ with respect to Z axis in the directions of X- and Y-axis simultaneously. Accordingly, by deflecting the laser beam #1 in the negative direction of X-axis and the positive direction of Y-axis simultaneously, and the laser beam #3 in the positive direction of X-axis and the negative direction of Y-axis simultaneously, it is possible to rearrange the reflection paths of the laser beams #1, #2 and #3 to lie in the X-Z plane as shown in FIG. 10A, from an arrangement thereof in the X-Y plane shown in FIG. 15A. In the similar manner, when the mirror surface 4 poses an illustrated attitude shown in FIG. 10B, by deflecting the laser beam #1 in the positive direction of X-axis and the negative direction of Y-axis simultaneously, and the laser beam #3 in the negative direction of X-axis and the positive direction of Y-axis simultaneously, it is possible to rearrange the reflection paths of the laser beams #1, #2 and #3 to lie in the X-Z plane as shown in FIG. 10B, from an arrangement thereof in the X-Y plane shown in FIG. 15C.

Figure 11:
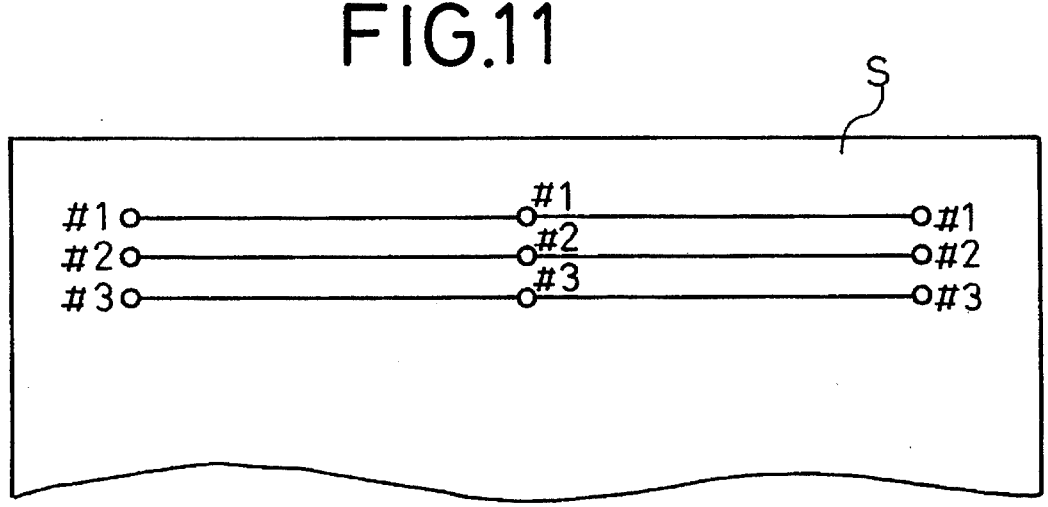
FIG. 11 shows scanned loci produced by the light beams on the recording sheet according to the second embodiment.

Thus, by adjusting the directions of incidence upon the mirror surface 4 of the laser beams #1 and #3 two-dimensionally, it is always possible to arrange the reflected paths of the laser beams #1, #2 and #3 to lie in the X-Z plane, with the scanned loci thereof lying parallel and having the lengths thereof equal to each other, over the entire range of the recording sheet S as shown in FIG. 11.

Figure 12A:
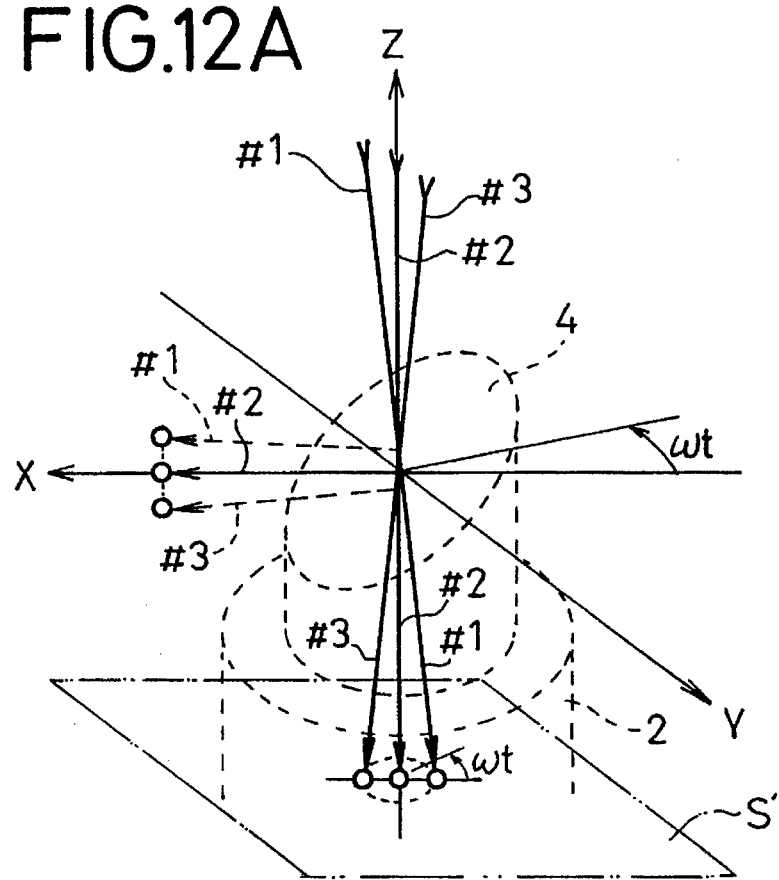
FIGS. 12A and 12B show loci drawn by the light beams on a conjugate plane of the recording sheet according to the second embodiment.
Figure 12B:
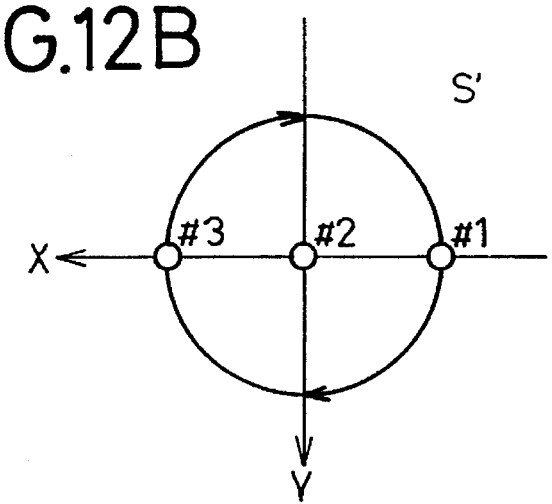

In the above-described adjustment of the laser beams, when the laser beams #1, #2 and #3 incident upon the mirror surface 4 are projected on a conjugate plane S' of the recording sheet S, the loci of the laser beams #1 and #3 on the conjugate plane S' draw a circle as shown in FIG. 12B, which is represented by the following formulas:

$$\left.\begin{array}{l} X = -a \cdot \cos \omega t \\ Y = -a \cdot \sin \omega t \end{array}\right\} \text{locus of laser beam \#1}$$

$$\left.\begin{array}{l} X = a \cdot \cos \omega t \\ Y = a \cdot \sin \omega t \end{array}\right\} \text{locus of laser beam \#3}$$

Therefore, by deflecting the laser beams #1 and #3 according to the above formulas and leading them to the optical scanning device 2, it is possible to form scanned loci thereof separated with a given interval on the recording sheet S as shown in FIG. 11.

Figure 9C:
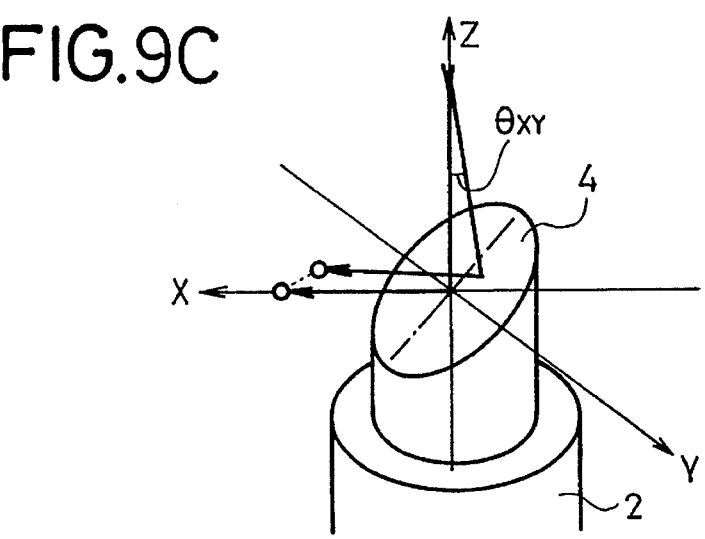

FIG. 13 shows an apparatus for putting into operation the principle described above on which the second embodiment of the present invention is based. The apparatus shown in FIG. 13 comprises an acousto-optical device 10X for deflecting the laser beam #1 in the direction of X-axis of the optical scanning device 2 as shown in FIGS. 9A–9C and an acousto-optical device 10Y for deflecting the laser beam #1 in the direction of Y-axis and modulate it according to image information, an acousto-optical device 12 for modulating the laser beam #2 according to the image information without deflecting it, an acousto-optical device 4X for deflecting the laser beam #3 in the direction of the X-axis and an acousto-optical device 14Y for deflecting the laser beam #3 in the direction of the Y-axis and modulate it according to the image information. Constitution other than the above is identical to that of the first embodiment shown in FIG. 5.

Figure 14:
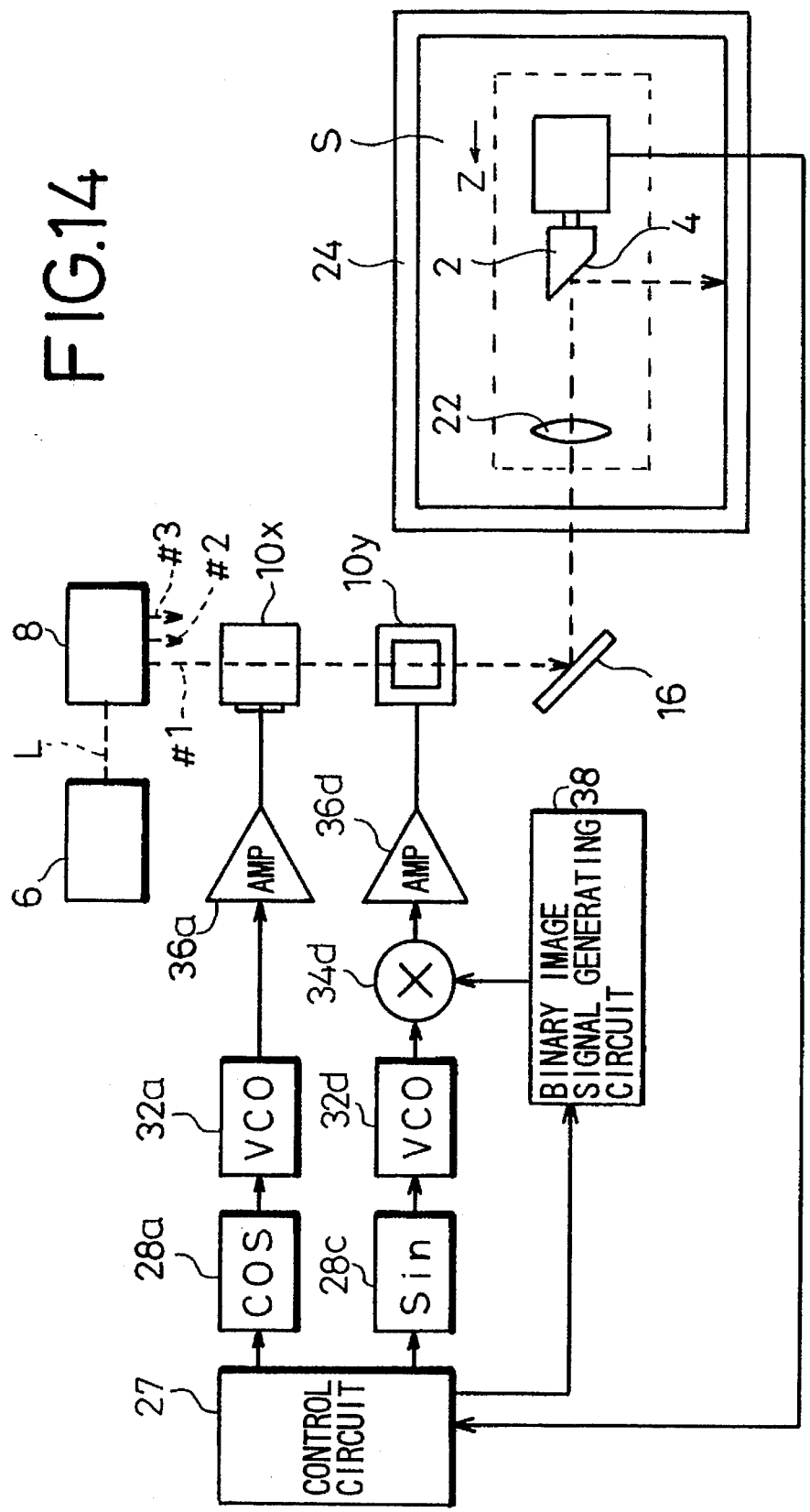
FIG. 14 is a block diagram showing a control circuit employed in the apparatus shown in FIG. 13.

FIG. 14 is a diagram of a circuit for controlling the acousto-optical devices 10X and 10Y shown in FIG. 13.

The circuit shown in FIG. 14 comprises a control circuit 27 for generating control clock signals based on a signal from an encoder (not shown) provided in the optical scanning device 2, a cosine-wave signal generating circuit 28a for generating a cosine-wave voltage signal (X=−a·cos ωt) based on the control clock signal, a sine-wave signal generating circuit 28c for generating a sine-wave voltage signal (Y=−a·sin ωt) based on the control clock signal, a voltage-controlled oscillator 32a for frequency-modulating the cosine-wave voltage signal, a voltage-controlled oscillator 32d for frequency-modulating the sine-wave voltage signal, an amplifier 36a for amplifying the frequency-modulated signal from the voltage-controlled oscillator 32a and supplying the amplified signal to the acousto-optical device 10X, a binary image signal generating circuit 38 for generating a binary image signal of a desired image based on the control clock signal from the control circuit 27, a modulator 34d for modulating the frequency-modulated signal from the voltage-controlled oscillator 32d according to the binary image signal, and an amplifier 36d for amplifying the modulated signal from the modulator 34d and supplying the amplified signal to the acousto-optical device 10Y.

A circuit for controlling the acousto-optical devices 14X and 14Y is constituted identically to the circuit shown in FIG. 14 except for that the cosine-wave signal generating circuit 28a generates another cosine-wave voltage signal (X=a·cos ωt), and the sine-wave signal generating circuit 28c generates another sine-wave voltage signal (Y=a·sin ωt).

The operation of the apparatus shown in FIG. 13 will be described below.

The laser beam L outputted from the laser beam generator 6 is splitted into three laser beams #1, #2, #3. The laser beam #1 is deflected by the acousto-optical device 10Y in the direction of Y-axis and simultaneously on/off controlled according to image information, after being deflected by the acousto-optical device 10X in the direction of X-axis (see FIGS. 10A, 10B). Then, the laser beam #1 is led to the optical scanning device 2 through the condenser lens 22, after being reflected by the mirror 16. The optical scanning device 2 reflects the laser beam #1 on the mirror surface 4 rotating about the central axis of the drum 24 and leads it onto the recording sheet S. The laser beam #3 is also led onto the recording sheet S through the acousto-optical devices 14X and 14Y, the mirror 20, the condenser lens 22 and the optical scanning device 2. The laser beam #2 incident upon the mirror surface 4 at its center of rotation is led onto the recording sheet S through the mirror 18, condenser lens 22 and the optical scanning device 2, after on/off controlled by the acousto-optical device 12 according to the image information, without being deflected. As shown in FIG. 11, an image is formed on the recording sheet S by three scanned loci of the laser beams which run parallel to each other with a given interval therebetween and having the lengths equal to each other.

Next, the manner in which the laser beam #1 is controlled will be described in detail with reference to FIG. 14.

The control circuit 27 supplies one of the control clock signals to the cosine-wave signal generating circuit 28a in response to the rotational position signal supplied by the unillustrated encoder provided in the optical scanning device 2. The cosine-wave voltage signal (X=–a·cos ωt) outputted from the cosine-wave signal generating circuit 28a is converted into a frequency modulated signal by the voltage-controlled oscillator 32a and supplied to the acousto-optical device 10X via the amplifier 36a. The acousto-optical devices 10X deflects the laser beam #1 in the direction of X-axis based on the cosine-wave voltage signal, as shown in FIGS. 10A, 10B.

The control circuit 27 also supplies another control clock signal to the sine-wave signal generating circuit 28c. The sine-wave voltage signal (Y=–a·sin ωt) outputted from the sine-wave signal generating circuit 28c is converted into a frequency-modulated signal by the voltage-controlled oscillator 32d and on/off controlled by the modulator 34d according to a binary image signal supplied from the binary image signal generating circuit 38. The frequency modulated and on/off controlled signal is supplied to the acousto-optical device 10Y via the amplifier 36d. The acousto-optical device 10Y deflects the laser beam #1 which is deflected in the direction of X-axis by the acousto-optical device 10X further in the direction of Y-axis based on the sine-wave voltage signal, as shown in FIGS. 10A, 10B.

As a result, as shown in FIGS. 12A and 12B, the laser beam #1 led to the mirror surface 4 of the optical scanning device 2 draws substantially a circle on a plane S' perpendicular to the rotational axis of the optical scanning device 2 in synchronism with the rotation thereof. The drawn circle is not necessarily a complete round when correction signals for correcting the distortion or aberration in the optical system is added, as described below. Similarly, the laser beam #3 also draws substantially a circle off-phase by 180° from that of the laser beam #1 on the plane S' as shown in FIGS. 12A and 12B. The laser beam #2 is led to the recording sheet S without making any motion on the plane S' after only being on/off controlled. As shown in FIG. 11, the laser beams #1, #2 and #3 controlled to maintain a given interval between them are led to the recording sheet S and an image is recorded thereon. The interval may be easily controlled by the amplification factors set for the amplifiers 36a and 36d.

In the second embodiment described above, the acousto-optical devices 10X and 10Y are constructed separately. However, it is possible to construct them in one body, thereby to deflect the laser beam in both X- and Y-directions and modulate it according to the image information with one acousto-optical device. In the above-described embodiments, the acousto-optical device can be replaced with an electro-optical device. Further, more than four laser beams may be used to record images. The beam splitter 8 may be dispensed with by using separate laser beam generators which generate laser beams #1, #2 and #3 independently. When the independently generated laser beams #1, #2 and #3 are led to the acousto-optical devices 10X, 10Y and 14X, 14Y, respectively, heterodyne interference between laser beams may be avoided from occurring, thereby resulting in a further improved image recorded. When the deflection amounts in the laser beams #1 and #3 by the acousto-optical devices 10X, 10Y and 14X, 14Y are made to be switchable, it is possible to realize a cylindrical interior surface scanning type image recording apparatus in which the resolution of the image is changeable. By adding correction signals to the cosine-wave signal generators 28a, 28b or the sine-wave signal generator 28c, it is possible to realize an apparatus in which aberration in the condenser lens 22, distortion in the mirror surface 4, wobbling of the rotation axis of the mirror, distorted scanned loci due to laser beams #1, #2 or #3 incident askew or displaced (offset) upon the mirror surface 4, and so on, are corrected.

Having now fully described the invention, it will be apparent to those skilled in the art that many changes and modification can be made without departing from the spirit or scope of the invention as set forth herein.

What is claimed is:

1. An apparatus for recording images on a recording sheet held on an interior surface of a cylinder with a plurality of light beams modulated according to image information and running parallel to each other at a predetermined interval, comprising:

light beam generating means for generating said plurality of light beams;

optical scanning means disposed on a central axis of said cylinder and rotated thereabout, comprising a mirror surface inclined with respect to the central axis of the cylinder, for scanning said recording sheet with each light beam incident upon said mirror surface along the central axis of the cylinder and reflected by the mirror surface which is rotating;

light beam deflecting means for deflecting light beams selected from said plurality of light beams off the central axis of the cylinder to give each of said selected light beams an angle of incidence upon said mirror surface in order for the plurality of light beams reflected by the mirror surface to be separated at said predetermined interval from each other on the recording sheet; and control means for controlling the direction and amount in which each of said selected light beams is deflected by said light beam deflecting means, in synchronism with the rotation of said scanning means.

2. An apparatus for recording images according to claim 1, wherein said selected light beams are other than the light beam incident upon said mirror surface at its center of rotation.

3. An apparatus for recording images according to claim 2, wherein said light beam deflecting means deflects each of said selected light beams back and forth in synchronism with the rotation of said scanning means under the control of said control means, in a plane including each of said selected light beams and lying parallel to another at a given distance.

4. An apparatus for recording images according to claim 3, wherein said control means comprises output timing control circuit for controlling output timing at which each of said plurality of light beams is outputted.

5. An apparatus for recording images according to claim 2, wherein said light beam deflecting means comprises first and second light beam deflecting devices for deflecting each of said selected light beams in a first direction and synchronizedly in a second direction perpendicular to said first direction, under the control of said control means.

6. An apparatus for recording images according to claim 5, wherein each of said selected light beams deflected by said light beam deflecting means draws substantially a circle on a plane perpendicular to said central axis of the cylinder, with the center of the circle being at a point where the central axis of the cylinder crosses said plane.

7. An apparatus for recording images according to claim 5, wherein said first and second light beam deflecting devices are constructed in one body.

8. An apparatus for recording images according to claim 1, wherein said light beam deflecting means comprises an acousto-optical device.

9. An apparatus for recording images according to claim 1, wherein said light beam deflecting means comprises an electro-optical device.

10. An apparatus for recording images according to claim 1, wherein said light beam generating means comprises a plurality of light beam generators for generating respective said plurality of light beams.

* * * * *